US012771996B2

(12) United States Patent
Hustava et al.

(10) Patent No.: US 12,771,996 B2
(45) Date of Patent: Oct. 20, 2026

(54) REDUCING OR ELIMINATING TRANSDUCER REVERBERATION

(71) Applicant: SEMICONDUCTOR COMPONENTS INDUSTRIES, LLC, Scottsdale, AZ (US)

(72) Inventors: Marek Hustava, Bratislava (SK); Tomas Suchy, Brno (CZ); Michal Navratil, Pustimer (CZ); Jiri Kutej, Brno (CZ)

(73) Assignee: SEMICONDUCTOR COMPONENTS INDUSTRIES, LLC, Scottsdale, AZ (US)

( * ) Notice: Subject to any disclaimer, the term of this patent is extended or adjusted under 35 U.S.C. 154(b) by 170 days.

(21) Appl. No.: 18/977,726

(22) Filed: Dec. 11, 2024

(65) Prior Publication Data

US 2025/0106554 A1 Mar. 27, 2025

Related U.S. Application Data

(60) Continuation of application No. 17/021,775, filed on Sep. 15, 2020, now Pat. No. 12,684,289, which is a division of application No. 15/784,345, filed on Oct. 16, 2017, now abandoned.

(60) Provisional application No. 62/430,171, filed on Dec. 5, 2016.

(51) Int. Cl.

| | |
|---|---|
| ***H04R 3/00*** | (2006.01) |
| ***G01S 7/52*** | (2006.01) |
| ***G01S 15/93*** | (2020.01) |
| ***G01S 15/931*** | (2020.01) |
| ***G08G 1/16*** | (2006.01) |
| ***G10K 11/178*** | (2006.01) |

(52) U.S. Cl.

CPC ................ *H04R 3/002* (2013.01); *G01S 7/52* (2013.01); *G01S 7/52004* (2013.01); *G01S 15/93* (2013.01); *G01S 15/931* (2013.01); *G08G 1/165* (2013.01); *G10K 11/178* (2013.01); *G01S 2015/932* (2013.01)

(58) Field of Classification Search

None

See application file for complete search history.

(56) References Cited

FOREIGN PATENT DOCUMENTS

CN 207457503 U * 6/2018 ........... G01S 15/931

* cited by examiner

*Primary Examiner* — Jonathan D Armstrong

(74) *Attorney, Agent, or Firm* — Ramey LLP

(57) ABSTRACT

An obstacle monitoring system includes a transducer that receives an ultrasonic echo from an obstacle and generates a signal based on the echo. The system further includes a controller coupled to the transducer that is calibrated based on a frequency response of the transducer and a coupling circuit. The system further includes circuitry generating a damping current, controlled by the controller, that reduces or eliminates reverberation of the transducer.

19 Claims, 5 Drawing Sheets

REDUCING OR ELIMINATING TRANSDUCER REVERBERATION

CROSS-REFERENCE TO RELATED APPLICATION

This application is a continuation of U.S. application Ser. No. 17/021,775, filed Sep. 15, 2020, which is a divisional of U.S. application Ser. No. 15/784,345, titled "Reducing or Eliminating Transducer Reverberation" and filed Oct. 16, 2017, which in turn claims the benefit of U.S. Provisional Application No. 62/430,171, titled "Distance Measurement Using Ultrasonic Park Assist Sensors" and filed Dec. 5, 2016. Each of these applications is hereby incorporated herein by reference.

BACKGROUND

The core concept of ultrasound distance detection is to transmit an ultrasound pulse at an obstacle and measure how soon echoes from the obstacle are received in order to determine the distance to the obstacle. Specifically, the time between transmission of the pulse and reception of the echo is linearly proportional to the distance to the obstacle. However, ringing prevents using the same transducer as both a transmitter and receiver until the ringing has subsided to the point that the received waves exceed the magnitude of the waves being emitted. Such transducers effectively cannot sense a reflection from an obstacle closer than some particular distance from the transducer depending on the amount of ringing. Thus, when it is necessary to sense the presence of an obstacle closer than the particular distance, ultrasonic systems heretofore have required that pairs of transducers be used, one transducer for sending and another for receiving. The requirement to use pairs of transducers increases the cost, complexity, and size of the system.

SUMMARY

Accordingly, systems and methods for reducing or eliminating transducer reverberation are disclosed herein. An obstacle monitoring system includes a transducer that receives an ultrasonic echo from an obstacle and generates a signal based on the echo. The system further includes a damping digital filter coupled to the transducer that is calibrated based on a frequency response of the transducer and a coupling circuit. The system further includes circuitry generating a damping current, controlled by the damping digital filter, that reduces or eliminates reverberation of the transducer.

An obstacle monitoring method includes receiving an ultrasonic echo from an obstacle, and generating a signal based on the echo. The method further includes calibrating a circuit by selecting coefficients for a digital damping finite impulse response ("FIR") filter based on a frequency response to the signal. The method further includes reducing or eliminating reverberation by introducing the damping current controlled by digital damping filter.

An obstacle monitoring system includes a transducer that receives an ultrasonic echo from an obstacle and generates a signal based on the echo. The system further includes a controller that drives the transducer in a first mode or a second mode. The first mode includes driving the transducer at a resonance frequency for relatively longer distances between the transducer and the obstacle. The second mode includes driving the transducer at an out-of-resonance frequency, higher than the resonance frequency, for relatively shorter distances between the transducer and the obstacle to reduce or eliminate reverberation of the transducer.

BRIEF DESCRIPTION OF THE DRAWINGS

Systems and methods for reducing or eliminating transducer reverberation are disclosed herein. In the drawings.

Figure 1:
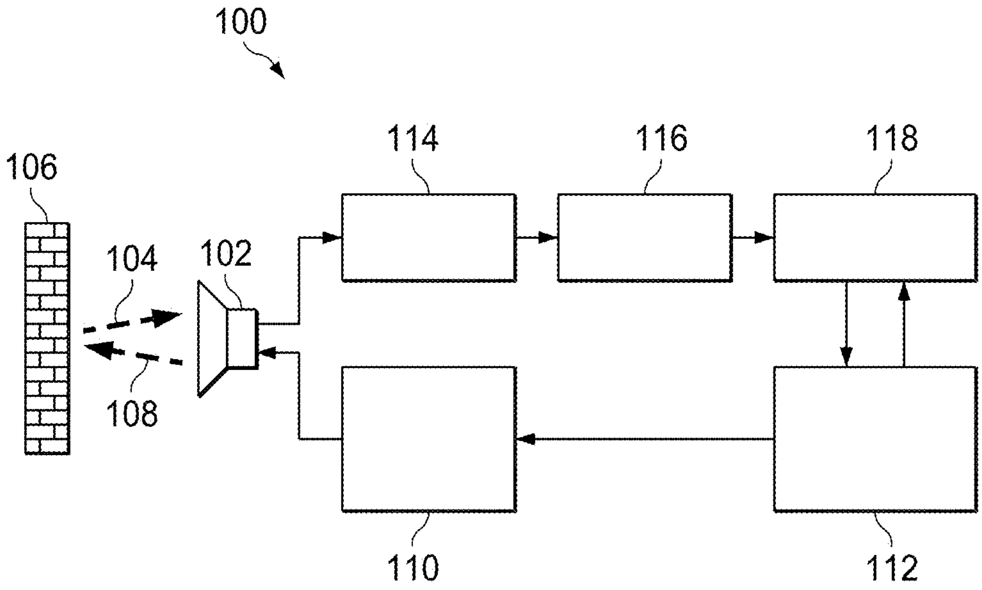
FIG. 1 is a diagram illustrating a transducer sending a pulse toward an obstacle and receiving an echo from the obstacle.

It should be understood, however, that the specific embodiments given in the drawings and detailed description thereto do not limit the disclosure. On the contrary, they provide the foundation for one of ordinary skill to discern the alternative forms, equivalents, and modifications that are encompassed together with one or more of the given embodiments in the scope of the appended claims.

NOTATION AND NOMENCLATURE

Certain terms are used throughout the following description and claims to refer to particular system components and configurations. As one of ordinary skill will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or a direct electrical or physical connection. Thus, if a first device couples to a second device, that connection may be through a direct electrical connection, through an indirect electrical connection via other devices and connections, through a direct physical connection, or through an indirect physical connection via other devices and connections in various embodiments.

DETAILED DESCRIPTION

For clarity, the examples used herein discuss parking-assist systems, however the concepts of this disclosure may be applied to any type of obstacle monitoring that prioritizes rapid response. Due to the resonant nature of transducers, reverberations of transducer membranes occur during transmission and shortly thereafter. The reverberations effectively result in a dead time during which it is not possible to detect echoes, and hence detect the obstacle. As such, the dead time is equivalent to a minimum detection distance for the sensor. By reducing or eliminating the reverberations and dead time, the minimum detection distance for the sensor is also reduced or eliminated. Accordingly, close and/or fast-moving obstacles, previously undetectable or detectable without enough time to perform corrective actions or generate alerts, may be detected with enough time to perform corrective actions or generate alerts. Specifically, fast damping may be performed using a digital filter to sense transducer voltage, apply a finite impulse response ("FIR") filter, and control a damping current that reduces or eliminates reverberations. For example, frequency-dependent admittance may be placed in parallel with the transducer, with a transformer present or not present, to create a high damping resistance as illustrated in the Figures and described below. A common obstacle-monitoring scenario is illustrated in FIG. 1.

FIG. 1 is a diagram of an illustrative obstacle monitoring system 100 including a transducer 102 sending a pulse 108 toward an obstacle 106 and receiving an echo 104. The distance between the transducer 102 and the obstacle 106 is determined by measuring the time between transmission of the pulse 108 and reception of the echo 104 and multiplying that time by the speed of sound in air. In various embodiments, the speed of sound in another material is used.

The system 100 also includes a pulse generator 112 and transmit driver 110 coupled to the transducer 102. The generator 112 may generate an up-chirp, a down-chirp, or a variable-chirp of custom bandwidth, duration, and center frequency as desired. The generator 112 may adjust the pulses 108 to be sent by the transducer 102 based on feedback from previous measurements. For example, the pulses 108 may be adjusted based on minimum detection distance (with increased pulse duration, minimum distance is decreased); signal-to-noise ratio and maximum detection distance (with increased pulse duration, signal-to-noise ratio and maximum detection distance are increased); reliability of channel separation (with increased pulse duration, channel separation is improved); time-of-flight accuracy and resolution (a wider bandwidth results in improved accuracy and resolution); transducer bandwidth; and the like. The generator 112 supplies the generated pulse to the transmit driver 110, which transforms the pulse into an appropriate signal for the transducer 102 to transmit. Specifically, the transmit driver 110 embeds the pulse within an appropriate carrier to transmit the pulse over the channel. The transmit driver 110 supplies the signal to the transducer 102, which transmits the pulse 108 toward the obstacle and receives the echo 104.

The system 100 also includes an amplifier 114 and a controller, which are configured to amplify useful signal components from the echo 104 and control a damping current that reduces or eliminates reverberation of the transducer 102, respectively. The controller may be a damping digital filter, analog filter, correlator, integrator, or derivator in various embodiments. For clarity, the example of a digital damping filter 116 is used herein. The system 100 also includes a correlator 118. The correlator 118 is configured to determine the time at which the correlation between the pulse 108 and echo 104 is highest. By designating such time as the reception time of the echo 104, the time-of-flight of the pulse 108 and echo 104 may be determined by differencing the transmit time and reception time. Accordingly, the distance to the obstacle 106 may be determined by multiplying the speed of sound and the time-of-flight. Data from the echo 104 is provided as feedback to the frequency pulse generator 112, which may make adjustments to future pulses based on the data. Without the damping digital filer 116, reverberation interferes with echo detection as illustrated in FIG. 2.

Figure 2:
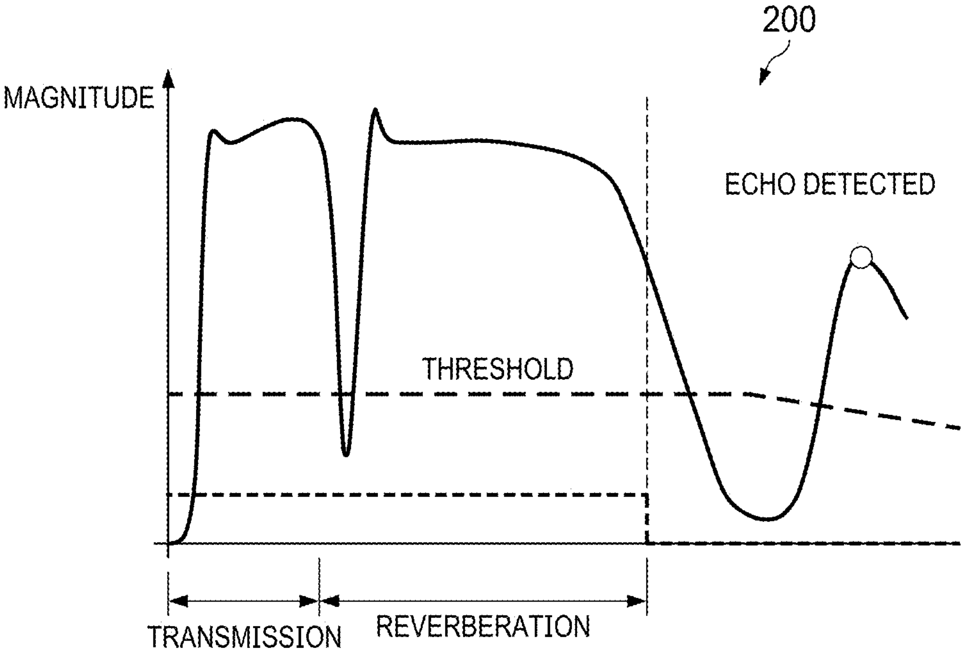
FIG. 2 is a chart illustrating pulse transmission, reverberation, and echo detection.

FIG. 2 is a chart 200 of an illustrative transmission (TX), reverberation, and echo magnitude at the transducer as a function of time. Starting from earliest time, the leftmost peak in magnitude illustrates transmission of the pulse toward the obstacle. The next peak illustrates the reverberation caused by the pulse transmission. As can be seen, the reverberation has a higher magnitude than an echo detection threshold, represented by the horizontal line, for a substantial length of time (even longer than the transmission). Echoes may be detected only when the reverberation magnitude is under the echo detection threshold. The third peak illustrates an echo received at the transducer. Should such an echo be received during the time the reverberation exceeds the threshold, then the echo would not be detected or correctly interpreted as an echo. As such, in this example, the third peak may be a second or third echo (the first or second echo being obscured by the reverberation). By reducing or eliminating the reverberation, for example by using the circuitry illustrated in FIG. 3, such obscured echoes can be detected.

Figure 3:
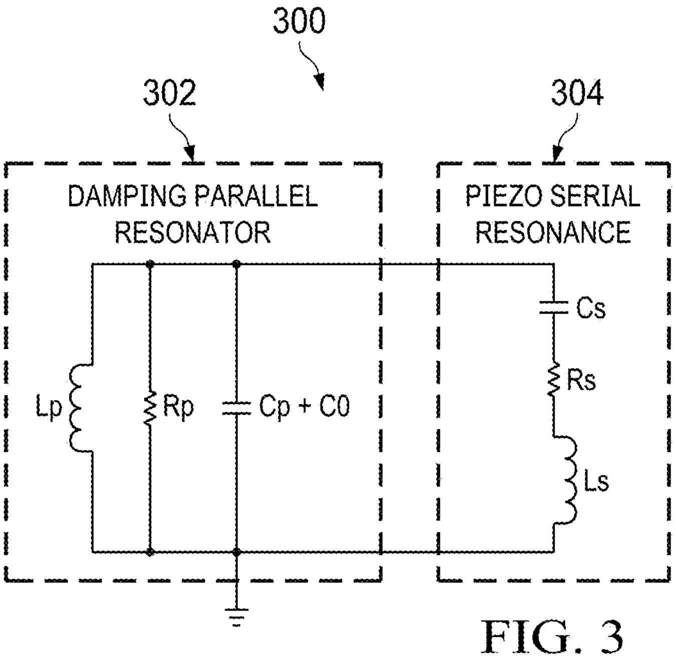
FIG. 3 is a circuit diagram illustrating damping circuitry.

FIG. 3 illustrates a circuit 300 able to reduce and/or eliminate reverberations in obstacle monitoring systems. Specifically, damping circuitry 302 is coupled to transducer circuitry 304 in order to reduce or eliminate reverberations on a transducer, e.g. a piezo transducer. The transducer circuitry 304 includes a capacitor Cs, a resistor Rs, and an inductor Ls that forms an equivalent resonance circuit for the transducer. The damping circuitry 302 includes a capacitor Cp+C0, a resistor Rp, and an inductor Lp that forms an equivalent tuned parallel resonant circuit that dampens the transducer circuitry 302, where C0 represents a parasitic capacitance. The resonant frequency of the transducer circuitry 304 is given by $f=1/(2\pi\sqrt{(LsCs)})$. The damping circuitry 302 is tuned to the same resonant frequency by adjusting the values of one or more of Lp, Rp, and Cp. By maximizing the resistance or impedance of the damping circuitry 302, without creating circuit chattering, reduction in reverberation of the transducer circuitry 304 may be maximized as well.

One alternative damping method is fast damping using a digital filter. The digital filter may provide flexibility. Embodiments using digital damping may create optimal conditions to speed the dampening process. With digital damping piezo voltage is sensed, an FIR filter is applied, and the damping current source is controlled. In some embodiments, this creates frequency dependent admittance which may be placed in parallel with the piezo, whether the transformer is present or not. This may result in high damping resistance. In one embodiment, the digitally created admittance may be calibrated in field for current temperature, piezo, external components and other properties. This calibration process may be automatic. Due to in-field calibration, damping time is independent of temperature, production spread and aging.

Figure 4:
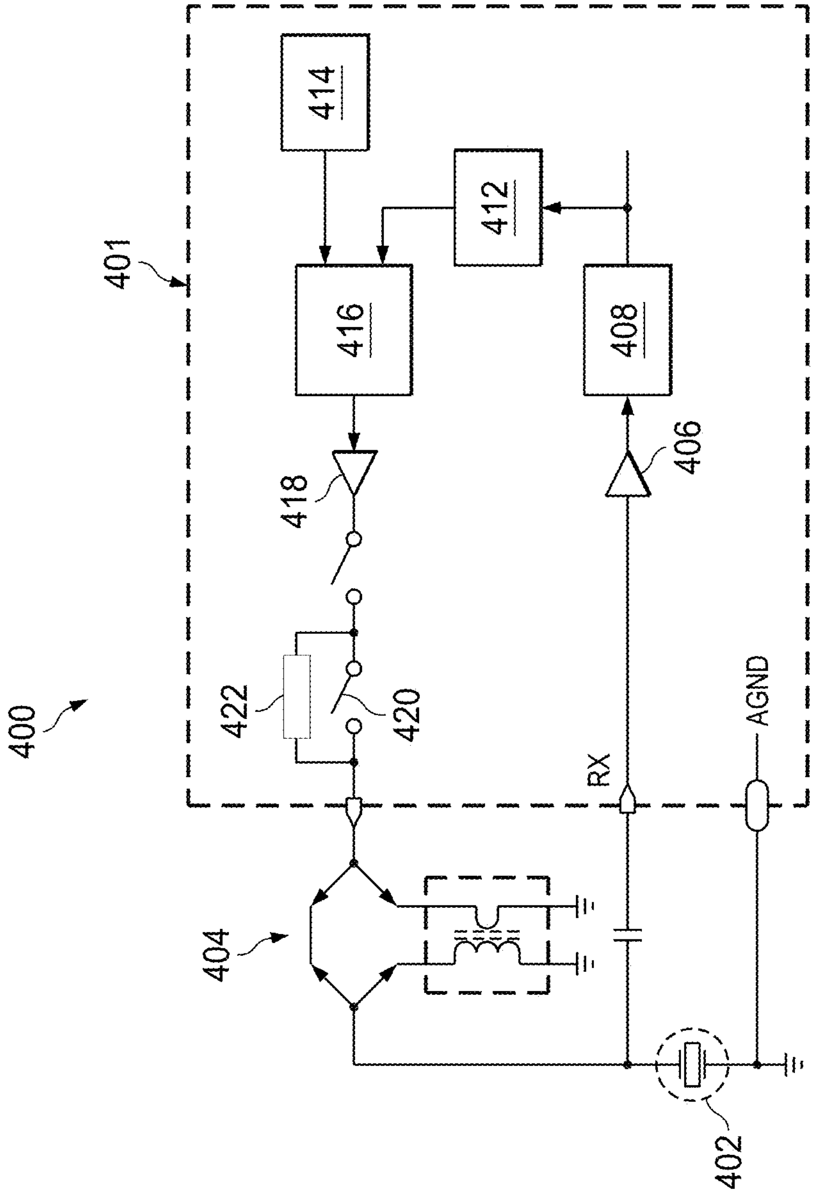
FIG. 4 is another circuit diagram illustrating damping circuitry.

FIG. 4 illustrates system 400 for obstacle monitoring including a circuit 401 coupled to a piezo transducer 402 and optional transformer 404. The circuit 401 includes a receive amplifier 406, an analog-to-digital converter ("ADC") 408, a controller, a transmit driver 414, a digital-to-analog converter ("DAC") 416, a transmit amplifier 418. The controller may be a damping digital filter, analog filter, correlator, integrator, or derivator in various embodiments. For clarity, the example of a digital damping filter 412 is used herein.

The transducer 402 transmits an ultrasonic pulse at an obstacle and receives an ultrasonic echo from the obstacle. In at least one embodiment, the obstacle may be monitored up to at least five centimeters from the transducer 402, and the transducer 402 may include a two-pin piezo whether used with the transformer 404 or without the transformer 404. Next, the transducer 402 generates a signal based on the echo and provides the signal to the circuit 401. The signal is processed by the receive amplifier 406 to remove noise and/or increase desirable signal components. Next, the ADC 408 digitizes and/or samples the signal for input into the digital damping filter 412.

The digital damping filter 412 is calibrated based on a frequency response of the transducer 402 and the circuit 401. For example, a square wave calibration pulse is transmitted, and the impulse response to the pulse is captured by recording the transducer voltage during the response. The digital damping filter 412 controls a damping current that reduces or eliminates reverberation of the transducer 402. For example, the filter 412 controls a switch 420 that introduces circuitry 422 made up of any number of circuit elements that provide the damping current. Specifically, coefficients are selected for the digital damping filter 412 based on a frequency response of the circuit 401 to the signal. Specifically, the coefficients ensure wide band frequency characteristics coexist with a high damping impedance. After the signal is converted to an analog signal by the DAC 416 and amplified for transmission by the transmit amplifier 418.

The digital damping filter 412 may be recalibrated upon changes in the ambient temperature, the transducer 402, or the transducer characteristics. In at least one embodiment, the digitally created admittance may be calibrated in-field for current temperature, piezo, external component, and other properties. This calibration process may be automatic, i.e. may occur without human input. Due to in-field calibration, damping time is independent of temperature, production spread and aging. Accordingly, reduction or elimination of reverberation can occur over a complete range of temperatures (e.g. −40 to 85 degrees Celsius) and transducer parameters. As such, the circuitry 401 is not finely tuned for one transducer, but is able to be finely tuned for all transducers. Accordingly, the circuitry 401 has the flexibility to be used in different environments and applications without modification.

Figure 5:
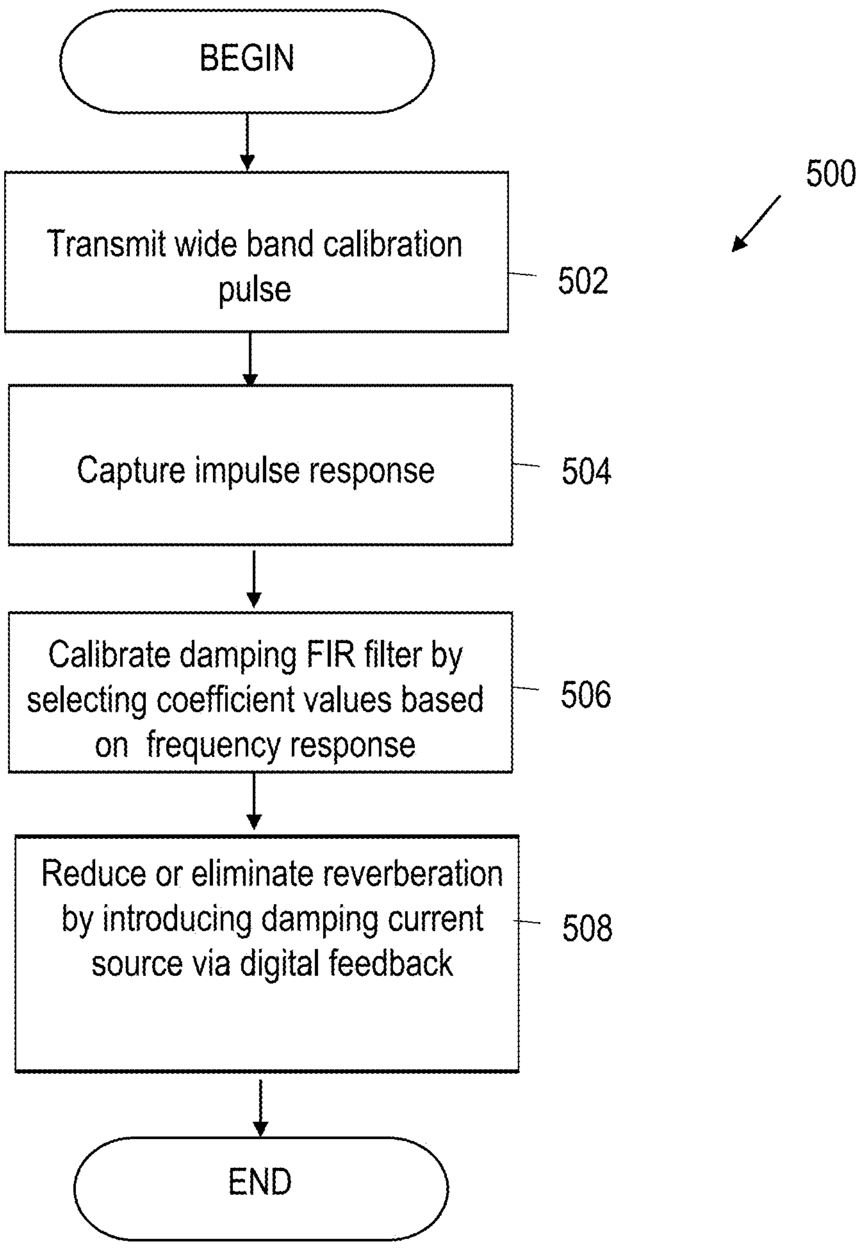
FIG. 5 is a flow diagram illustrating a method for reducing or eliminating transducer reverberation.

FIG. 5 is a flow diagram of an illustrative method 500 for obstacle monitoring. At 502, a wide band calibration pulse is transmitted. For example, a wide band ultrasonic pulse is transmitted at an obstacle to create an ultrasonic echo. The ultrasonic echo is received from the obstacle, and at 504 the impulse response to the echo is captured. For example, a signal representing the impulse response is generated based on the echo.

At 506, a damping finite impulse response ("FIR") filter is calibrated by selecting coefficient values based on the frequency response. In various embodiments, calibrating the filter is accomplished in different ways. For example, calibrating the filter may include measuring a resonance frequency and modifying the coefficients for the filter based on the resonance frequency as described above. As another example, calibrating the filter may include measuring a junction or sensor temperature and modifying the coefficients of the filter based on the junction or sensor temperature. In another embodiment, calibrating the filter may include measuring transmission power of a transmission that causes the echo and modifying the coefficients for the digital damping filter based on the transmission power.

At 508, reverberation is reduced or eliminated by introducing the damping current controlled by digital damping filter. As such, a time may be predicted at which the magnitude of reverberation falls under a threshold. Accordingly, a signal, received after the predicted time with a magnitude above the threshold, may be interpreted as another echo and not as a continuation of reverberation. The method 500 may also include determining a distance from the transducer to an obstacle that reflects the echo, and generating an alert if the distance is below a threshold. Additionally, if the distance is below a threshold a corrective action may be performed such as applying a braking force to an automobile on which the transducer is located. Finally, the method may include generating an audio, visual, or audiovisual alert based on detected obstacles. Such alerts may be output through displays, speakers, and the like.

In another embodiment of the present disclosure, damping may be accomplished by driving the transducer out-of-resonance. Specifically, an obstacle monitoring system includes a transducer that receives an ultrasonic echo from an obstacle and generates a signal based on the echo. The system further includes a controller that drives the transducer in a first mode or a second mode. The first mode includes driving the transducer at a resonance frequency for relatively longer distances between the transducer and the obstacle. The second mode includes driving the transducer at an out-of-resonance frequency, higher than the resonance frequency, for relatively shorter distances between the transducer and the obstacle to reduce or eliminate reverberation of the transducer.

In at least one embodiment, the systems or methods described above are implemented in a parking assist system. For example, the systems may include an automobile housing a computer-readable medium coupled to one or more processors or controllers, which are coupled to one or more transducers. The non-transitory computer-readable medium may include instructions that, when executed, cause the one or more processors to perform any appropriate action described in this disclosure. The instructions may, for example, be located on a module for implementing a driver assistance system or a subsystem thereof in a vehicle, or an application for driver assistance functions. The instructions may be stored on a non-transitory machine-readable memory medium, for example, on a permanent or rewritable memory medium or in association with a computer device, for example, a removable CD-ROM, DVD, or on a portable mobile memory medium, such as a memory card or a USB stick. The transducers may be provided, for example, in the front and/or rear bumper of the automobile for the purpose of parking assistance and/or collision avoidance. Such a system may, for example, be configured to detect partial surroundings of the automobile. For example, transducers in the front area for detecting surroundings ahead of the automobile, transducers in the side area for detecting a side area of the motor vehicle, and/or transducers in the rear area for detecting a rear area of the automobile may each be included in the system. Such a system may generate an audio, visual, or audiovisual alert based on detected obstacles, and such alerts may be output through displays, speakers, and the like.

In some aspects systems and method for obstacle monitoring are provided according to one or more of the following examples:

Example 1: An obstacle monitoring system includes a transducer that receives an ultrasonic echo from an obstacle and generates a signal based on the echo. The system further includes a controller coupled to the transducer that is calibrated based on a frequency response of the transducer and a coupling circuit. The system further includes circuitry generating a damping current, controlled by the controller, that reduces or eliminates reverberation of the transducer.

Example 2: An obstacle monitoring method includes receiving an ultrasonic echo from an obstacle, and generating a signal based on the echo. The method further includes calibrating a circuit by selecting coefficients for a filter based on a response to the signal. The method further includes reducing or eliminating reverberation by introducing a damping current controlled by a controller.

Example 3: An obstacle monitoring system includes a transducer that receives an ultrasonic echo from an obstacle and generates a signal based on the echo. The system further includes a controller that drives the transducer in a first mode or a second mode. The first mode includes driving the transducer at a resonance frequency for relatively longer distances between the transducer and the obstacle. The second mode includes driving the transducer at an out-of-resonance frequency, lower or higher than the resonance frequency, for relatively shorter distances between the transducer and the obstacle to reduce or eliminate reverberation of the transducer.

The following features may be incorporated into the various embodiments described above, such features incorporated either individually in or conjunction with one or more of the other features. The damping digital filter may be recalibrated upon ambient temperature changes. The damping digital filter may be recalibrated upon changes in the transducer or transducer characteristics. The obstacle may be monitored up to at least five centimeters from the transducer. The transducer may include a two-pin piezo when used with a transformer or without a transformer. The system may also include an automobile on which the transducer is located. The transducer may be located on a bumper of the automobile. The transducer may transmit an ultrasonic pulse at the obstacle to create the echo. The method may also include predicting a time when the magnitude of reverberation falls under a threshold and interpreting a signal, received after the predicted time with a magnitude above the threshold, as another echo and not as a continuation of reverberation. Calibrating the circuit may also include measuring a resonance frequency and modifying the coefficients for the digital damping filter based on the resonance frequency. Calibrating the circuit may also include measuring a junction or sensor temperature and modifying the coefficients of digital damping filter based on the junction or sensor temperature. Calibrating the circuit may also include measuring transmission power of a transmission (piezo voltage) that causes the echo and modifying the coefficients for the digital damping filter based on the transmission power (piezo voltage). The method may also include transmitting an ultrasonic pulse at the obstacle to create the echo. The method may also include determining a distance from the transducer to the obstacle. The method may also include generating an alert if the distance is below a threshold. The method may also include performing a corrective action if the distance is below a threshold. The corrective action may be applying a braking force to an automobile on which the transducer is located.

Numerous other modifications, equivalents, and alternatives, will become apparent to those skilled in the art once the above disclosure is fully appreciated. It is intended that the following claims be interpreted to embrace all such modifications, equivalents, and alternatives where applicable.

What is claimed is:

1. A system comprising:

a transmit amplifier configured to drive a piezoelectric transducer to generate an ultrasonic pulse;

a receive amplifier configured to detect a receive signal from the piezoelectric transducer including an echo of the ultrasonic pulse from an obstacle;

an analog-to-digital converter (ADC) configured to digitize the receive signal into a digitized receive signal;

a digital damping filter configured to derive a digital damping signal from the digitized receive signal; and a digital-to-analog converter (DAC) configured to convert the digital damping signal into a damping signal coupled to the transmit amplifier to produce a damping current, the damping current providing a digitally created admittance parallel to the piezoelectric transducer to reduce damping time, the digital damping filter being calibrated to reduce dependence of the damping time on temperature.

2. The system of claim 1, further comprising: a controller configured to calibrate the digital damping filter based on a response of the piezoelectric transducer.

3. The system of claim 2, wherein the transmit amplifier is configured to supply a calibration pulse to the piezoelectric transducer and said response of the piezoelectric transducer is a response to the calibration pulse.

4. The system of claim 2, wherein the controller is configured to calibrate the digital damping filter based on a frequency response of the piezoelectric transducer.

5. The system of claim 2, wherein the controller is configured to calibrate the digital damping filter based on a resonance frequency of the piezoelectric transducer.

6. The system of claim 2, wherein the controller is configured to use the digitized receive signal from the piezoelectric transducer to measure transmission power and is configured to calibrate the digital damping filter based on the transmission power.

7. The system of claim 2, wherein the digital damping filter comprises a finite impulse response (FIR) filter having coefficients set by the controller.

8. The system of claim 7, wherein the controller is configured to measure a junction temperature and configured to modify said coefficients based on the junction temperature.

9. A method comprising:

using a piezoelectric transducer to transmit an ultrasonic pulse and to obtain a receive signal, the receive signal including an ultrasonic echo from an obstacle;

digitizing the receive signal into a digitized receive signal;

using a digital damping filter to convert the digitized receive signal into a digital damping signal;

converting the digital damping signal into a damping current configured to act as a digitally created admittance parallel to the piezoelectric transducer to reduce damping time; and calibrating the digital damping filter to reduce dependence of the damping time on temperature.

10. The method of claim 9, wherein said calibrating includes selecting filter coefficients of the digital damping filter based at least in part on a response of the piezoelectric transducer.

11. The method of claim 10, wherein the calibrating further includes supplying a calibration pulse to the piezoelectric transducer to measure said response.

12. The method of claim 10, wherein the response is a frequency response of the piezoelectric transducer.

13. The method of claim 10, wherein the calibrating includes measuring a resonance frequency and selecting the filter coefficients based on the resonance frequency.

14. The method of claim 10, wherein the calibrating includes measuring transmission power and selecting the filter coefficients based at least in part on the transmission power.

15. The method of claim 10, wherein the calibrating includes measuring a junction temperature and selecting said coefficients based on the junction temperature.

16. The method of claim 10, further comprising determining a distance from the piezoelectric transducer to the obstacle.

17. A circuit comprising:

an analog-to-digital converter (ADC) configured to couple to a piezoelectric transducer configured to receive ultrasonic echoes from an obstacle in response to ultrasonic pulses, the ADC configured to convert a signal from the piezoelectric transducer into a digitized signal;

a finite impulse response (FIR) filter configured to convert the digitized signal into a digital damping signal;

a controller configured to calibrate filter coefficients of the FIR filter based on a pulse response of the piezoelectric transducer;

a digital-to-analog converter (DAC) configured to convert the digital damping signal into a damping current that provides a digitally created admittance parallel to the piezoelectric transducer to reduce damping time.

18. The circuit of claim 17, wherein the controller is configured to measure a junction temperature and configured to modify said filter coefficients based on the junction temperature.

19. The circuit of claim 17, wherein the controller is configured to use the digitized signal from the piezoelectric transducer to measure transmission power and is configured to modify said filter coefficients based on the transmission power.

* * * * *